United States Patent
Biasotti et al.

(10) Patent No.: US 8,765,845 B2
(45) Date of Patent: Jul. 1, 2014

(54) HYDRAULIC BINDER COMPOSITION

(75) Inventors: Barbara Biasotti, Casarza Ligure (IT); Max Giudici, Lomazzo (IT); Ugo Pfeiffer, Milan (IT); Valentina Langella, Milan (IT); Giovanni Floridi, Novara (IT); Giuseppe Li Bassi, Gavirate (IT)

(73) Assignee: Lamberti SpA, Albizzate (VA) (IT)

( * ) Notice: Subject to any disclaimer, the term of this patent is extended or adjusted under 35 U.S.C. 154(b) by 0 days.

(21) Appl. No.: 13/977,458

(22) PCT Filed: Dec. 15, 2011

(86) PCT No.: PCT/EP2011/072939
§ 371 (c)(1),
(2), (4) Date: Jun. 28, 2013

(87) PCT Pub. No.: WO2012/089530
PCT Pub. Date: Jul. 5, 2012

(65) Prior Publication Data
US 2013/0289167 A1 Oct. 31, 2013

(30) Foreign Application Priority Data
Dec. 30, 2010 (IT) .............................. VA2010A0101

(51) Int. Cl.
C04B 24/02 (2006.01)

(52) U.S. Cl.
USPC ............................... 524/2; 536/114; 106/778

(58) Field of Classification Search
USPC ................................ 524/2; 536/114; 106/778
See application file for complete search history.

(56) References Cited

U.S. PATENT DOCUMENTS

| | | |
|---|---|---|
| 4,028,127 A | 6/1977 | Maske et al. |
| 4,487,864 A | 12/1984 | Bermudez et al. |
| 4,870,127 A | 9/1989 | Harris |
| 4,870,167 A * | 9/1989 | Zody et al. ..................... 536/114 |
| 4,960,876 A | 10/1990 | Molteni et al. |
| 5,233,032 A * | 8/1993 | Zody et al. ..................... 536/114 |
| 5,432,215 A | 7/1995 | Girg et al. |
| 6,706,112 B2 | 3/2004 | Sironi et al. |
| 7,355,039 B2 | 4/2008 | Rinaldi et al. |
| 2007/0213230 A1 * | 9/2007 | Pfeiffer et al. ................ 507/204 |

* cited by examiner

*Primary Examiner* — John Uselding
(74) *Attorney, Agent, or Firm* — Mossman, Kumar & Tyler, PC

(57) ABSTRACT

Compositions comprising a hydraulic binder such as cement or gypsum and a hydroxypropyl guar derivative that comprises unsubstituted linear or branched $C_6$-$C_8$ alkyl chains possess excellent water retention characteristics.

20 Claims, No Drawings

HYDRAULIC BINDER COMPOSITION

This application is a national stage entry of PCT/EP11/72939 filed Dec. 15, 2011, which claims priority to VA2010A000101 filed Dec. 30, 2010.

FIELD OF THE INVENTION

The present invention relates to dry compositions comprising a hydraulic binder, such as cement or gypsum, and a water retention agent which is a highly substituted hydroxypropyl guar derivative comprising an unsubstituted linear or branched $C_6$-$C_8$ alkyl chain.

BACKGROUND OF THE ART

It is well known to use hydraulic binder compositions in the construction field for making the infrastructure of buildings, works of art, apartment buildings or articles such as paving slabs or boards and tiles, and as adhesives or jointing compositions, particularly to adhere tiles or ceramics in general, vertically or horizontally, to plane surfaces of different kinds, such as to concrete, plywood or brick surfaces.

In the present text with the term "hydraulic binders" we designate mineral substances that in the presence of water harden because of hydration chemical reactions and can bind other materials together.

Hydraulic binder compositions that mainly consist of cement mixed with a variable amount of sand and possibly gypsum are generally used to prepare tile adhesives, mortars, concrete, cement plaster, finiture plaster, self-levelling flooring; hydraulic binder compositions based on gypsum are generally used to prepare gypsum plasters and joint compounds.

Immediately prior to use, a proper amount of water is added to the dry hydraulic binder composition, making it a workable paste and allowing the shaping of articles or the application on various surfaces.

The curing of the thus obtained hydraulic binder paste (from now on "paste"), also commonly referred to as "setting", begins as soon as the composition is admixed with water and will result in its complete hardening and its exhibiting the necessary physical and mechanical features.

Setting is a rather complex chemical process that leads to polymeric inorganic structures whose strong reciprocal interactions result in the formation of solid and strong masses.

In the setting process, many features are of importance and influence not only the speed at which setting occurs but also its final effectiveness, i.e. its solidity. Among these features of fundamental importance are the content of water and the capability of the composition to retain the proper amount of water during the whole setting process. It is important that the paste retains sufficient water until all the desired physical characteristics are obtained.

In practice, most of the surfaces onto which pastes are generally applied are porous and absorbent and they absorb water from the paste in the area of contact, thus creating defects in the setting which may at some point in time result in defects of the adhesion and of the mechanical properties of the hardened composition.

Another problem that may be encountered during the application of pastes that is related to the capability of the paste to retain the proper amount of water during the whole setting process is a too rapid hardening that prevents the adjustment of the laid strata or of the shaped articles. This problem is called "lack of open time" and/or "lack of adjustability time".

Yet another problem occurs when the content of water becomes excessive, even if only locally or because of a lack of homogeneity of mixing. In such cases, setting becomes too slow due to a too flowing mixture, working time grows longer and the resulting application becomes imprecise and difficult.

Another issue in the handling of pastes is the fact that water in the mixture acts as a lubricant for the solid particles when paste is spread on the surface of the object to which it is to be applied. The proper amount of water gives to the mixture the "pastiness" or "creaminess" suitable for a uniform, homogeneous and easy laying. The rheological characteristics of the final mixture are very important and they depend on the kind and on the amount of the different components in the mixture.

The rheology of a mixture of sand, cement and water alone, or of gypsum and water alone renders them unsuitable for use as pastes because of the lack of the above-mentioned characteristics, and more generally, because of their poor processing.

To overcome all these problems, additives are used in the formulation of hydraulic binder compositions acting as retention agents and rheology modifiers. These additives are generally synthetic or semi-synthetic polymers, usually chemically modified natural polymers, exhibiting the specific characteristic of bonding and coordinating a large amount of water once they are dissolved in water.

These products, and among these in particular cellulose ethers, are highly purified products whose preparation requires many sophisticated and complex purification steps. They are rather expensive products.

In literature many mixtures are described for use as rheology modifier and retention aid in pastes, such as in U.S. Pat. No. 6,706,112, U.S. Pat. No. 4,028,127, EP 235513, U.S. Pat. No. 5,432,215, and U.S. Pat. No. 4,487,864, in which mixtures are also described whose components show synergic effects.

In particular, U.S. Pat. No. 6,706,112 discloses cementitious mortar additives including at least a hydroxyalkyl guar ether having a molar substitution of from about 0.7 to about 3 which is able to impart to mortars very good water retention and an initial adhesion as good as the adhesion of mortars that include cellulose ethers. Nonetheless, it would be desirable in the art of preparing cement and/or gypsum pastes to provide additives that further improve the water retention properties and, as a consequence, the whole processing of such pastes.

Surprisingly, it has now been found that highly substituted hydroxypropyl guar ethers that further comprise a certain amount of relatively short hydrophobic unsubstituted alkyl chains impart improved water retention and processability to cement and/or gypsum pastes.

Hydrophobic hydroxypropyl guar derivatives bearing $C_{10}$-$C_{32}$ hydrophobic substituents have been described in the patent literature, by way of example in U.S. Pat. No. 4,870,127 and U.S. Pat. No. 4,960,876; they are said to be suitable for use in many industrial fields, such as in the manufacture of paper coatings and sizings, adhesives, liquid detergents, emulsions used to make polishes, cleaners and lattices, in compositions for textile printing and dyeing, and as textile binders and adhesives, in water borne coatings, as suspending agents in agricultural sprays and as suspending agents for pigments and inks, in the photographic processing and in the manufacture of ceramics, in cosmetics, in the general fields of mining, explosives and oil stimulation.

U.S. Pat. No. 4,870,127 also reports the synthesis of a hydroxypropyl guar derivative comprising a $C_6$-alkyl chain.

U.S. Pat. No. 7,355,039 describes the use of glyoxalated purified hydrophobic hydroxypropyl guar derivatives bearing hydrophobic $C_{10}$-$C_{32}$ alkyl chains for use in water based paints and varnishes, wall coverings, adhesives and mortars. None of the above prior art, however, does disclose or suggest that highly substituted hydroxypropyl guar derivative comprising an unsubstituted linear or branched $C_6$-$C_8$ alkyl chain are particularly effective as water retention agents in compositions comprising a hydraulic binder.

SUMMARY OF THE INVENTION

In one aspect, the invention is a dry composition comprising a hydraulic binder and from 0.1 to 2.0% wt of at least one compound which is a hydroxypropyl guar derivative comprising unsubstituted linear or branched $C_6$-$C_8$ alkyl chains.

In another aspect, the object of the invention is 2-hydroxypropyl-2-hydroxy-3-(2-ethylhexyloxy) propyl guar having hydroxypropyl molar degree of substitution ($MS_{HP}$) from 1.0 to 3.0 and alkyl degree of substitution ($DS_{Ak}$) from 0.01 to 0.20.

In still another aspect, the invention is a hydraulic binder paste prepared by admixing a dry composition comprising a hydraulic binder and from 0.1 to 2.0% wt of at least one compound which is a hydroxypropyl guar derivative comprising unsubstituted linear or branched $C_6$-$C_8$ alkyl chains with an amount of water of from about 10 to about 85 parts by weight for 100 parts by weight of the dry composition.

DETAILED DESCRIPTION OF THE INVENTION

The hydroxypropyl guar ethers are derivatives of a renewable raw material substrate, which due to their low production cost are desirable as replacements for other products now in use.

Guar, or guar gum, is a polysaccharide belonging to the family of galactomannans and is extracted from a leguminosae, "*Cyamopsis Tetragonolobus*", that grows in the semi-dry region of tropical countries, to particularly in India and in Pakistan.

Its hydroxyethyl and hydroxypropyl ether derivatives, obtained by reacting guar with ethylene oxide or propylene oxide under basic conditions, are commonly employed in the textile industry as printing paste thickeners, in the paints and coatings industry as rheology modifiers, in the drilling industry, in paper and explosives production and in other industry sectors (Industrial Gums 3rd Ed., 1993, Academic Press Inc., pp 199-205).

The polysaccharidic molecule of guar consists of a main linear chain of poly-mannose bearing branches of galactose units in a molar ratio of about 2:1.

The hydroxypropyl ethers commercially available generally have hydroxypropyl molar substitution from 0.2 to 3.

Many attempts have been made to positively modify the characteristics of guar derivatives and specifically of hydroxypropyl guar ethers and to make them suitable for use in mortars, as reported by way of example in U.S. Pat. No. 6,706,112 and in U.S. Pat. No. 7,355,039.

Surprisingly, it has now been determined that hydroxypropyl guar derivatives characterized by comprising unsubstituted linear or branched $C_6$-$C_8$ alkyl chains are particularly suitable as additives for the preparation of pastes based on cement or gypsum, being able to impart to them excellent water retention properties, without altering their additional applicative characteristics, such as adhesion and final strength.

A further relevant advantage of the guar derivatives of the present invention is the fact that they can be used in crude form as they guarantee good performances without the need of a purification step after their preparation, and, as a consequence, they are obtainable at a substantially low factory cost.

The hydroxypropyl guar derivatives useful for the present invention are hydroxypropyl guar derivatives having $MS_{HP}$ from 1.0 to 3.0, preferably from 1.5 to 2.0, and $DS_{Ak}$ from 0.01 to 0.20, preferably from 0.02 to 0.10.

For the purposes of the present invention, the hydroxypropyl molar degree of substitution, that is the average number of moles of hydroxypropyl groups linked per monosaccharidic unit, is abbreviated "$MS_{HP}$" and is determined by $^1$H-NMR (effective molar substitution).

For the purposes of the present invention, the $C_6$-$C_8$ alkyl degree of substitution, that is the average number of moles of unsubstituted linear or branched $C_6$-$C_8$ alkyl chains linked per monosaccharidic unit, is abbreviated "$DS_{Ak}$" and is also is determined by $^1$H-NMR (effective degree of substitution).

The unsubstituted linear or branched $C_6$-$C_8$ alkyl chains may be introduced by reacting the hydroxypropyl guar with a linear or branched $C_6$-$C_8$ alkyl halide, or with a linear or branched $C_8$-$C_{10}$ 1,2 epoxide, or with a linear or branched $C_6$-$C_8$ alkyl glycidyl ether, obtaining respectively an alkyl ether derivative, a hydroxyalkyl ether derivative and a 2-hydroxy-3-(alkyloxy) propyl ether derivative.

Particularly preferred for use as water retention agents in compositions comprising a hydraulic binder are hydroxypropyl guar derivatives comprising n-hexyl chains or 2-ethylhexyl chains.

The most preferred hydroxypropyl guar derivative is 2-hydroxypropyl-2-hydroxy-3-(2-ethylhexyloxy) propyl guar.

The dry compositions of the present invention generally contain from 5 to 80% by weight of cement and/or gypsum as the hydraulic binder; preferably, in case the hydraulic binder is gypsum, the amount of hydraulic binder is from 40 to 80% by weight, while in case the hydraulic binder is cement, its amount ranges from 5 to 60% by weight.

The cement may be Portland cement or a Portland cement admixture or a non-Portland hydraulic cement, such as calcium aluminate cement, calcium sulfoaluminate cement, pozzolan lime cement.

Preferred cements are Portland cement and Portland cements admixtures (by way of example, slag Portland cement, pozzolan Portland cement, fly ash Portland cement, blastfurnace Portland cement and all the Portland cement admixtures defined in standard EN 197-1 A3).

The gypsum may be calcium sulphate hemihydrate or anhydrite, most preferably is calcium sulphate hemihydrate.

Dry compositions comprising cement mixed with a variable amount of sand and possibly gyspum serve as the base materials for producing mortars, grouts, concrete, tile adhesives, cement plaster, finiture plaster, self-levelling flooring. Cement based dry hydraulic binder compositions may also be reinforced with fibres for the manufacture of fibrocements used, for example, as a material for making articles for covering roofs, pipework or tanks.

The hydroxypropyl guar derivative comprising unsubstituted linear or branched $C_6$-$C_8$ alkyl chains is also an efficient additive for controlling the filtration of liquids from cement compositions. Moreover, it exhibits a better resistance to high temperatures than the natural polymers currently used in the cementing of oil wells. As a consequence, the dry compositions according to the invention in which the hydraulic binder is cement may also serve as the base material for hydraulic binder pastes useful for the cementation of oil wells.

Dry compositions based on gypsum are used to prepare gypsum plasters, joint compounds, gypsum mortars and grouts.

Typical additional ingredients of cement based dry hydraulic binder compositions are fine and coarse aggregates (sand and/or gravel).

Beside cement and/or gypsum, water retention agent and possibly aggregates, there are several other additives that can be added to the hydraulic binder composition of the invention before or during mixing with water.

Organic polymeric binders are typical additional ingredients of hydraulic binder compositions for tile adhesives, joints compounds and self-levelling floorings; calcium carbonate is usually present in gypsum and cement mortars and plasters, in joint compounds and self levelling flooring compositions.

Other chemical additives that may be present are usually classified according to their function; they act as air-entraining, water-reducing, retarding, accelerating, plasticizers and superplasticizers aids.

Other varieties of additives fall into the specialty category, whose functions include corrosion inhibition, shrinkage reduction, workability enhancement, bonding, damp proofing, and colouring.

Hydraulic binder pastes may be prepared from the above described dry compositions, by adding gradually the dry composition to water and mixing.

The correct amount of water is the one that allows to obtain the paste in the form of a uniform slurry that has good workability.

Normally this amount ranges from about 10 to about 85 parts by weight of water per 100 parts by weight of dry composition, and preferably from about 10 to about 45 parts by weight per 100 parts by weight of dry composition when the hydraulic binder is cement, from 35 to 80 parts by weight per 100 parts by weight of dry composition when the hydraulic binder is gypsum.

EXAMPLES

Preparation of the Water Retention Agents

Preparation of n-hexyl-2-hydroxypropyl guar ($nC_6HPG$)

In a 5 liters stirred reactor, 800 g of guar flour are charged at room temperature, the reaction atmosphere is made inert by means of vacuum/nitrogen washings, and, under vigorous stirring, 106 g of a 30% solution of NaOH mixed in 250 g of a water/isopropanol solution are added. The stirring is continued for 15 minutes at 20° C.

The reactor is evacuated and filled three times with nitrogen and 530 g of propylene oxide are added in three batches while stirring for 4 hours at 65-70° C. When the pressure into the reactor is stable 127 g of n-hexyl bromide, previously dissolved in isopropanol, are added and the stirring is continued at 70-75° C. over 2 h.

The reaction mixture is cooled down to 40° C. and neutralised by addition of acetic acid to pH about 5-6.5.

The isopropanol is distilled in vacuum for 20 minutes.

The obtained reaction mixture is dried on a fluid bed drier by using hot air until to the humidity content is about 3% by weight, milled and analysed.

The obtained product (WRA No. 1) has $DS_{Ak}$=0.05 and $MS_1$=1.6.

Analogously, the water retention agents (WRA) reported in Table 1 were prepared.

The RVT Brookfield® viscosities ($V_B$) of the water retention agents are measured in aqueous solutions at 2% by weight (WRA No. 1-6) or at 1% by weight (WRA No. 7), at 20° C. and 20 rpm, and are reported in Table 1.

TABLE 1

| WRA No. | WRA Identity | $MS_{HP}$ | $DS_{Ak}$ | $V_B$ (mPa * s) |
|---|---|---|---|---|
| 1 | $nC_6HPG$ | 1.6 | 0.05 | 7680[4] |
| 2 | $nC_6HPG$ | 1.8 | 0.06 | 6980[4] |
| 3* | $nC_3HPG$[1] | 1.7 | 0.08 | 7820[4] |
| 4* | $nC_3HPG$[1] | 1.8 | 0.30 | 2850[4] |
| 5* | $nC_4HPG$[2] | 1.7 | 0.07 | 8300[4] |
| 6* | $nC_4HPG$[2] | 1.8 | 0.15 | 5740[4] |
| 7* | $nC_{10}HPG$[3] | 1.8 | 0.01 | 2230[5] |

*comparative
[1] n-propyl-2-hydroxypropyl guar
[2] n-butyl-2-hydroxypropyl guar
[3] n-decyl-2-hydroxypropyl guar
[4] at 2% by weight
[5] at 1% by weight Preparation of 2-Hydroxypropyl-2-hydroxy-3-(2-ethylhexyloxy)propyl guar ($bC_8OHPG$)

In a 5 liters stirred reactor, 800 g of guar flour are charged at room temperature, the reaction atmosphere is made inert by means of vacuum/nitrogen washings, and, under vigorous stirring, 106 g of a 30% solution of NaOH mixed in 250 g of a water/isopropanol solution are added.

The stirring is continued for 15 minutes at 20° C. temperature; 43 g of 2-ethyl-hexyl glycidyl ether diluted in isopropanol (50 g) are added and the mixture is stirred over 15 minutes.

The reactor is evacuated and filled three times with nitrogen and 530 g of propylene oxide are added in three batches while stirring for 6 hours at 65-70° C. The reaction mixture is cooled to 40° C. and neutralised by addition of acetic acid to pH about 5-6.5.

The isopropanol is distilled off in vacuum for 20 minutes.

The obtained reaction mixture is dried on a fluid bed drier by using hot air until the humidity content is about 3% by weight, milled and analysed.

The obtained product (WRA No. 8) has $DS_{Ak}$=0.03 and $MS_{HP}$=1.7.

Analogously, the other water retention agents reported in Table 2 were prepared; the comparative WRAs were prepared from butylene oxide and from hexadecyl glycidyl ether.

The RVT Brookfield® viscosities ($V_B$) of the water retention agents are measured in aqueous solutions at 1% by weight (WRA No. 8-9) or at 2% by weight (WRA No. 10-12), at 20° C. and 20 rpm, and are reported in Table 2.

Application Tests

The application tests were done to determine the water retention properties and consistency of compositions comprising the water retention agents of the Examples.

The methods used in the application tests are the following:

Water Retention (WR) is measured according to standard test method ASTM C1506-09.

Consistency (C) is measured according to standard test method ASTM C230/230M-08.

The tests were performed both on a cement plaster composition and on a gypsum plaster composition.

The cement plaster composition comprising Portland cement as the hydraulic binder was prepared by adding 21 parts by weight of water and 0.1 parts by weight of WRA per 100 parts by weight of dry mix (Composition 1).

The results are reported in Table 3.

The plaster composition comprising gypsum as the hydraulic binder was prepared by adding 64 parts by weight of water and 0.25 parts by weight of WRA per 100 parts by weight of dry mix (Composition 2).

The results are reported in Table 4.

The results show that the additional presence of unsubstituted linear or branched $C_6$-$C_8$ alkyl chains remarkably improves the water retention properties of highly substituted hydroxypropyl guar and makes them excellent rheology modifiers and water retention agents for hydraulic binder compositions, both based on gypsum and on cement.

TABLE 2

| WRA No. | WRA Identity | $MS_{HP}$ | $DS_{Ak}$ | $V_B$ (mPa * s) |
|---|---|---|---|---|
| 8 | $bC_8OHPG$ | 1.7 | 0.03 | 1490[4] |
| 9 | $bC_8OHPG$ | 1.7 | 0.04 | 2920[4] |
| 10* | $nC_2OHPG$[1] | 1.7 | 0.23 | 6100[5] |
| 11* | $nC_2OHPG$[1] | 1.8 | 0.38 | 5900[5] |
| 12* | $nC_{16}OHPG$[2] | 1.8 | $1 * 10^{-3}$ [3] | 10060[5] |

*comparative
[1] 2-hydroxybutyl-2-hydroxypropylguar
[2] 2-hydroxypropyl-2-hydroxy-3-hexadecyloxypropyl guar
[3] determined by GC-MS
[4] at 1% by weight
[5] at 2% by weight

TABLE 3

| Cement plaster | | |
|---|---|---|
| WRA No. | WR | C |
| 1 | 91 | 173 |
| 2 | 90 | 178 |
| 3* | 80 | 158 |
| 4* | 72 | 172 |
| 5* | 81 | 161 |
| 6* | 80 | 162 |
| 7* | <65 | 149 |
| 8 | 91 | 167 |
| 10* | 83 | n.d. |
| 11* | 82 | n.d. |
| 12* | <65 | 142 |
| HPG[1]* | 82 | 177 |

*comparative
[1] hydroxypropyl guar having $MS_{HP}$ = 1.7

TABLE 4

| Gypsum plaster | | |
|---|---|---|
| WRA No. | WR | C |
| 8 | 92 | 179 |
| 9 | 91 | 159 |
| HPG[1]* | 86 | 170 |

*comparative
[1] hydroxypropyl guar having $MS_{HP}$ = 1.7

The invention claimed is:

1. A dry composition comprising a hydraulic binder and from 0.1 to 2.0% wt of at least one compound which is a hydroxypropyl guar derivative comprising unsubstituted linear or branched $C_6$-$C_8$ alkyl chains.

2. The dry composition of claim 1 wherein the hydraulic binder is selected from the group consisting of cement, gypsum, and mixtures thereof.

3. The dry composition of claim 2 wherein the hydraulic binder is present at a concentration of from about 5 to about 80 wt %.

4. The dry composition of claim 2 wherein the hydraulic binder comprises Portland cement.

5. The dry composition of claim 2 wherein the hydraulic binder is calcium sulphate hemihydrate.

6. The dry composition according of claim 1 wherein the hydroxypropyl guar derivative has an $MS_{HP}$ of from about 1.0 to about 3.0 and a $DS_{Ak}$ of from about 0.01 to about 0.20.

7. The dry composition according of claim 2 wherein the hydroxypropyl guar derivative has an $MS_{HP}$ of from about 1.0 to about 3.0 and a $DS_{Ak}$ of from about 0.01 to about 0.20.

8. The dry composition according of claim 3 wherein the hydroxypropyl guar derivative has an $MS_{HP}$ of from about 1.0 to about 3.0 and a $DS_{Ak}$ of from about 0.01 to about 0.20.

9. The dry composition according of claim 4 wherein the hydroxypropyl guar derivative has an $MS_{HP}$ of from about 1.0 to about 3.0 and a $DS_{Ak}$ of from about 0.01 to about 0.20.

10. The dry composition according of claim 5 wherein the hydroxypropyl guar derivative has an $MS_{HP}$ of from about 1.0 to about 3.0 and a $DS_{Ak}$ of from about 0.01 to about 0.20.

11. The dry composition of claim 6 wherein the hydroxypropyl guar derivative has a $MS_{HP}$ of from about 1.5 to about 2.0 and a $DS_{Ak}$ of from about 0.02 to about 0.10.

12. The dry composition of claim 6 wherein the hydroxypropyl guar derivative is 2-hydroxypropyl-2-hydroxy-3-(2-ethylhexyloxy)propyl guar.

13. The dry composition of claim 7 wherein the hydroxypropyl guar derivative is 2-hydroxypropyl-2-hydroxy-3-(2-ethylhexyloxy)propyl guar.

14. The dry composition of claim 1 additionally comprising from about 0.1 to about 7 wt % of a polymeric organic binder.

15. The dry composition of claim 2 additionally comprising from about 0.1 to about 7 wt % of a polymeric organic binder.

16. The dry composition of claim 3 additionally comprising from about 0.1 to about 7 wt % of a polymeric organic binder.

17. The dry composition of claim 6 additionally comprising from about 0.1 to about 7 wt % of a polymeric organic binder.

18. The dry composition of claim 7 additionally comprising from about 0.1 to about 7 wt % of a polymeric organic binder.

19. A 2-Hydroxypropyl-2-hydroxy-3-(2-ethylhexyloxy)propyl guar having an $MS_{HP}$ of from about 1.0 to about 3.0 and a $DS_{Ak}$ of from about 0.01 to about 0.20.

20. A hydraulic binder paste prepared by admixing a dry composition according to claim 1 with an amount of water of from about 10 to about 85 parts by weight for 100 parts by weight of the dry composition.

* * * * *